US008400516B2

(12) United States Patent
Yamada et al.

(10) Patent No.: US 8,400,516 B2
(45) Date of Patent: Mar. 19, 2013

(54) IMAGE STABILIZATION CONTROL CIRCUIT AND IMAGING DEVICE HAVING IMAGE STABILIZATION CONTROL CIRCUIT

(75) Inventors: Yasuhisa Yamada, Aichi (JP); Yuuki Tashita, Gifu (JP)

(73) Assignees: Sanyo Semiconductor Co., Ltd. (JP); Semiconductor Components Industries, LLC, Phoenix, AZ (US)

( * ) Notice: Subject to any disclaimer, the term of this patent is extended or adjusted under 35 U.S.C. 154(b) by 383 days.

(21) Appl. No.: 12/327,293

(22) Filed: Dec. 3, 2008

(65) Prior Publication Data
US 2009/0160958 A1   Jun. 25, 2009

(30) Foreign Application Priority Data

Dec. 21, 2007 (JP) .................................. 2007-330624

(51) Int. Cl.
*H04N 5/228* (2006.01)
*G03B 17/00* (2006.01)

(52) U.S. Cl. ...................... 348/208.7; 348/208.2; 396/55

(58) Field of Classification Search ............. 348/208.99, 348/208.2, 208.4, 208.7, 208.8, 208.11; 396/52–55
See application file for complete search history.

(56) References Cited

U.S. PATENT DOCUMENTS

| | | | |
|---|---|---|---|
| 5,459,311 A | 10/1995 | Brosnan | |
| 5,541,508 A * | 7/1996 | Suzuki | ..................... 324/207.21 |
| 5,566,093 A | 10/1996 | White | |
| 5,634,145 A | 5/1997 | Ohishi et al. | |
| 5,822,623 A | 10/1998 | Urata et al. | |
| 5,893,054 A | 4/1999 | White | |
| 6,233,009 B1 | 5/2001 | Morofuji et al. | |
| 6,501,399 B1 | 12/2002 | Byrd | |
| 7,460,154 B2 | 12/2008 | Kawahara | |
| 7,502,050 B2 | 3/2009 | Hatanaka et al. | |
| 7,640,741 B2 | 1/2010 | Hara | |
| 7,881,402 B2 | 2/2011 | Gao et al. | |

(Continued)

FOREIGN PATENT DOCUMENTS

| | | |
|---|---|---|
| CN | 100559253 C | 11/2009 |
| EP | 1507408 A2 | 2/2005 |

(Continued)

OTHER PUBLICATIONS

Office Action for Chinese Application No. 200810177436.2 issued Apr. 29, 2010 with English translation.

(Continued)

*Primary Examiner* — Daniel M Pasiewicz
(74) *Attorney, Agent, or Firm* — Cantor Colburn LLP

(57) ABSTRACT

A image stabilization control circuit is provided that comprises at least one analog-to-digital converter circuit that converts an output signal of a vibration detection element which detects vibration of an imaging device, and an output signal of a position detection element which detects a position of an optical component or an imaging element, into digital signals, and a logic circuit that generates a control signal which drives the optical component or the imaging element, based on the output signal of the vibration detection element which is digitized by the analog-to-digital converter circuit and the output signal of the position detection element which is digitized by the analog-to-digital converter circuit, wherein an offset value and an amplitude for the output signal of the position detection element are adjusted.

6 Claims, 4 Drawing Sheets

U.S. PATENT DOCUMENTS

| | | |
|---|---|---|
| 2001/0038749 A1 | 11/2001 | Imada |
| 2002/0118844 A1 | 8/2002 | Welsh et al. |
| 2004/0052513 A1 | 3/2004 | Ohkawara et al. |
| 2004/0056963 A1 | 3/2004 | Ishikawa |
| 2005/0018051 A1 | 1/2005 | Tomita et al. |
| 2005/0200712 A1* | 9/2005 | Uenaka .................. 348/208.99 |
| 2005/0201741 A1 | 9/2005 | Moriya |
| 2006/0072912 A1 | 4/2006 | Momochi et al. |
| 2007/0103032 A1 | 5/2007 | Yamashita |
| 2007/0223755 A1 | 9/2007 | Salvetti et al. |
| 2009/0141134 A1 | 6/2009 | Kamiya et al. |
| 2009/0160953 A1 | 6/2009 | Nagata et al. |
| 2010/0214426 A1 | 8/2010 | Kimura |
| 2011/0043646 A1 | 2/2011 | Watanabe et al. |

FOREIGN PATENT DOCUMENTS

| | | |
|---|---|---|
| JP | 1-293739 A | 11/1989 |
| JP | 2-20925 A | 1/1990 |
| JP | 2-262843 A | 10/1990 |
| JP | 6-313718 A | 11/1994 |
| JP | 7-325330 A | 12/1995 |
| JP | 8-76061 A | 3/1996 |
| JP | 8-79598 A | 3/1996 |
| JP | 8-240831 A | 9/1996 |
| JP | 10-213832 A | 8/1998 |
| JP | 11-98420 A | 4/1999 |
| JP | 2000-13671 A | 1/2000 |
| JP | 2000-250086 A | 9/2000 |
| JP | 2000-356733 A | 12/2000 |
| JP | 20000-13671 A | 1/2001 |
| JP | 2004-328606 A | 11/2004 |
| JP | 2005-115253 A | 4/2005 |
| JP | 2007-101672 A | 4/2007 |
| JP | 2007-127754 A | 5/2007 |
| JP | 2007-206382 A | 8/2007 |

OTHER PUBLICATIONS

Office Action for Korean Application No. 10-2008-119661 issued on Mar. 19, 2010 with English translation.

Office Action for Korean Application No. 10-2008-119384 issued Apr. 1, 2010 with English translation.

Office Action for Chinese application No. 200810182174.9 issued Apr. 22, 2010 with English translation.

Office Action for Korean Application No. 10-2008-119547 issued Apr. 1, 2010 with English translation.

Office Action for Korean Patent Application No. 10-2008-119661 mailed Sep. 17, 2010 with English translation.

Office Action for Korean Patent Application No. 10-2010-58542 mailed Sep. 17, 2010 with English translation.

U.S. Office Action for U.S. Appl. No. 12/341,721 dated May 27, 2011.

U.S. Office Action for U.S. Appl. No. 12/327,235 dated Mar. 10, 2011.

U.S. Office Action for U.S. Appl. No. 12/343,646 dated Apr. 22, 2011.

Aronhime, P. 1999. All-Pass Filters. Wiley Encyclopedia of Electrical and Electronics Engineering.

Notice of Grounds for Rejection for Japanese Patent Application Serial No. 2007-330624, mailed Feb. 14, 2012, with English translation.

Notice of Grounds for Rejection for Japanese Patent Application Serial No. 2007-330623, mailed Feb. 14, 2012, with English translation.

Notice of Grounds for Rejection for Japanese Patent Application No. 2007-332465, mailed Jun. 5, 2012, with English translation.

Notice of Grounds for Rejection for Patent Application No. 2007-332466, mailed Jun. 5, 2012, with English translation.

United States Patent & Trademark Office Official communication, Office Action for U.S. Appl. No. 12/341,721, dated Dec. 8, 2011.

Japanese Office Action, Decision of Rejection for Japanese patent application No. 2007-330623 mailing date of Sep. 11, 2012 with English translation.

Japanese Office Action, Decision of Rejection, for Japanese patent application No. 2007-330624 mailing date of Sep. 11, 2012 with English translation.

* cited by examiner

IMAGE STABILIZATION CONTROL
CIRCUIT AND IMAGING DEVICE HAVING
IMAGE STABILIZATION CONTROL
CIRCUIT

CROSS-REFERENCE TO RELATED
APPLICATION

The disclosure of Japanese Patent Application No. 2007-330624 filed on Dec. 21, 2007 including specification, claims, drawings, and abstract is incorporated herein by reference.

BACKGROUND OF THE INVENTION

1. Field of the Invention

The present invention relates to a image stabilization control circuit which is equipped in an imaging device.

2. Description of the Related Art

Recently, imaging devices such as a digital still camera and a digital video camera realize improved image quality by increasing a number of pixels of an imaging element provided in the imaging device. On the other hand, as another method of realizing improved image quality for the imaging device, it is desired for the imaging device to have a vibration correction function in order to prevent vibration of an image of an object caused by vibration of the hand holding the imaging device.

More specifically, a detection element such as a gyro sensor is provided in an imaging device, and optical components such as the lens and the imaging element are driven according to an angular velocity component caused by vibration of the imaging device, to prevent vibration of the object image. With this structure, even if the imaging device is vibrated, the component of the vibration is not reflected in the obtained image signal, and an image signal having no image vibration and a high image quality can be acquired.

FIG. 5 is a block diagram of a image stabilization control circuit 100 of the related art which is used for realizing the vibration correction function. The image stabilization control circuit 100 is provided in an imaging device, and operates according to control of a main control circuit (not shown) provided in the imaging device. The image stabilization control circuit 100 is connected to a position detection element 102, a lens driving element 104, and a vibration detection element 106.

The position detection element 102 detects a position of a lens which is used in the imaging device. A hall element may be used as the position detection element 102. The hall element produces an inductive current corresponding to an absolute position of the lens and outputs a voltage signal to the image stabilization control circuit 100. A voice coil motor may be used as the lens driving element 104. The image stabilization control circuit 100 controls a position of a movable coil of the voice coil motor, that is, a position of the lens with respect to an optical axis which forms a reference, by adjusting the value of the voltage to be applied to the lens driving element 104. The lens driving element 104 drives the lens within a plane which is perpendicular to the reference optical axis of the imaging device. The vibration detection element 106 detects vibration of the imaging device and outputs the result of the detection to the image stabilization control circuit 100. A gyro sensor may be employed as the vibration detection element 106. The vibration detection element 106 generates an angular velocity signal corresponding to the vibration applied to the imaging device and outputs the angular velocity signal to the image stabilization control circuit 100.

For each of the position detection element 102, the lens driving element 104, and the vibration detection element 106, it is desired for at least two elements to be provided. For example, a plurality of elements are provided corresponding to a horizontal component and a vertical component in a plane perpendicular to the optical axis of the imaging device, and the lens position detection, lens movement, and vibration detection of the imaging device are executed.

Next, the image stabilization control circuit 100 will be described in detail. The image stabilization control circuit 100 comprises a servo circuit 10, a lens driver 12, an analog-to-digital converter circuit (ADC) 14, a CPU 16, and a digital-to-analog converter circuit (DAC) 18.

The servo circuit 10 generates a signal for controlling the lens driving element 104 according to the voltage signal which is output from the position detection element 102. The servo circuit 10 comprises an analog filter circuit including an external resistor element, a capacitor, etc., and generates a signal which controls the lens driving element 104 such that the optical axis of the lens matches the center of the imaging element provided in the imaging device. The lens driver 12 generates a lens driving signal which drives the lens driving element 104 based on the signal which is output from the servo circuit 10.

The ADC 14 converts the analog angular velocity signal which is output from the vibration detection element 106 into a digital signal. The CPU 16 generates an angle signal which indicates an amount of movement of the imaging device based on the digital angular velocity signal. The CPU 16 is connected to a memory (not shown) and executes the generation process of the angle signal based on software stored in the memory. The DAC 18 converts the digital angle signal generated by the CPU 16 into an analog signal.

The servo circuit 10 generates a signal which controls the lens driving element 104 according to a signal in which the analog angle signal which is output from the DAC 18 and the voltage signal which is output from the position detection element 102 are added. In other words, in order to prevent vibration of an object image due to hand vibration, the position of the lens is changed based on the angle signal indicating the amount of movement of the imaging device, to inhibit vibration of the image of the object on the imaging element. With this structure, the vibration of the object image due to the vibration of the hand can be inhibited and an image signal of high image quality can be obtained.

In order to improve a processing speed of the image stabilization control circuit, it is desired to replace the servo circuit, the lens driver, and the processor circuit of the vibration detection signal with logic circuits which can process digitally. In addition, because the image stabilization control circuit is equipped in an imaging element such as a digital camera or the like or a lens module of the imaging element, the size must be minimized even when logic circuits are employed.

The outputs from the hall elements equipped in the imaging device vary for each element. Therefore, a image stabilization control circuit is desired which can adjust an amplitude and a direct current voltage component (offset voltage) for an output signal of a hall element for each device in a timing such as, for example, prior to shipping of the imaging device.

SUMMARY OF THE INVENTION

According to one aspect of the present invention, there is provided a image stabilization control circuit which drives an optical component or an imaging element of an imaging device according to vibration and which reduces the influence of the vibration on imaging, the image stabilization control circuit comprising at least one analog-to-digital converter circuit which converts an output signal of a vibration detection element that detects vibration of the imaging device and an output signal of a position detection element which detects a position of the optical component or the imaging element, into digital signals, and a logic circuit that generates a control signal which drives the optical component or the imaging element, based on the output signal of the vibration detection element which is digitized by the analog-to-digital converter circuit and the output signal of the position detection element which is digitized by the analog-to-digital converter circuit. An offset value and an amplitude for the output signal of the position detection element are adjusted.

BRIEF DESCRIPTION OF THE DRAWINGS

Preferred embodiments of the present invention will be described in detail based on the following figures, wherein.

DESCRIPTION OF THE PREFERRED EMBODIMENT

Figure 1:
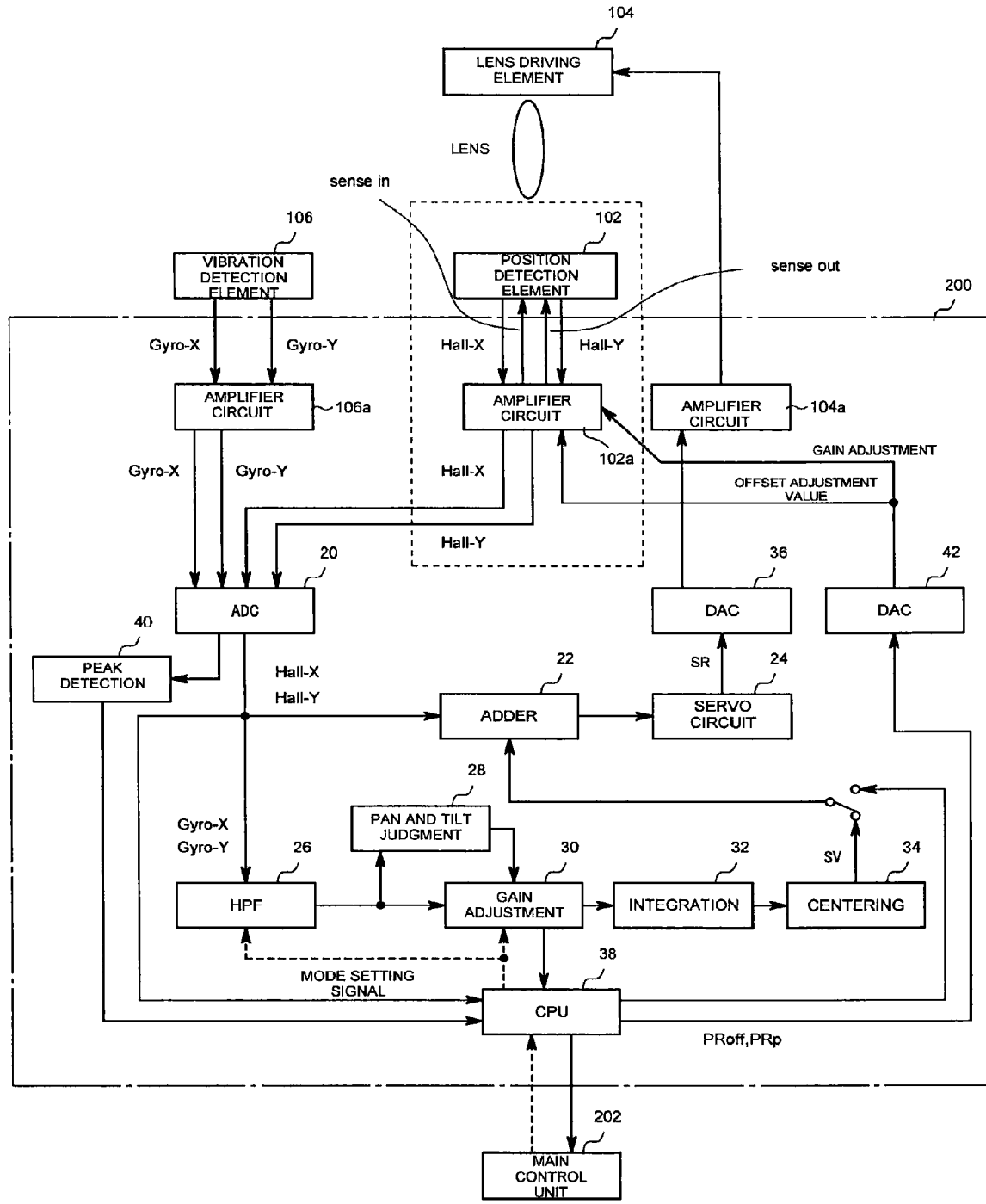
FIG. 1 is a diagram showing a structure of a image stabilization control circuit in a preferred embodiment of the present invention.

As shown in a functional block diagram of FIG. 1, a image stabilization control circuit 200 in a preferred embodiment of the present invention comprises an analog-to-digital conversion circuit (ADC) 20, an adder circuit 22, a servo circuit 24, a high-pass filter (HPF) 26, a pan and tilt judgment circuit 28, a gain adjustment circuit 30, an integration circuit 32, a centering processor circuit 34, a digital-to-analog converter circuit (DAC) 36, a CPU 38, a peak detection circuit 40, and a digital-to-analog converter circuit (DAC) 42.

The image stabilization control circuit 200 is connected to a position detection element 102, a lens driving element 104, and a vibration detection element 106. These elements are similar to those described above with reference to the related art. In other words, the position detection element 102 is provided for at least two axes so that the position of the lens driven by the lens driving element 104 can be measured in a manner to allow at least an orthogonal conversion, and the vibration detection element 106 is also provided for at least two axes so that the components of the vibration can be orthogonally converted along two axes in a yaw direction and a pitch direction.

Figure 2:
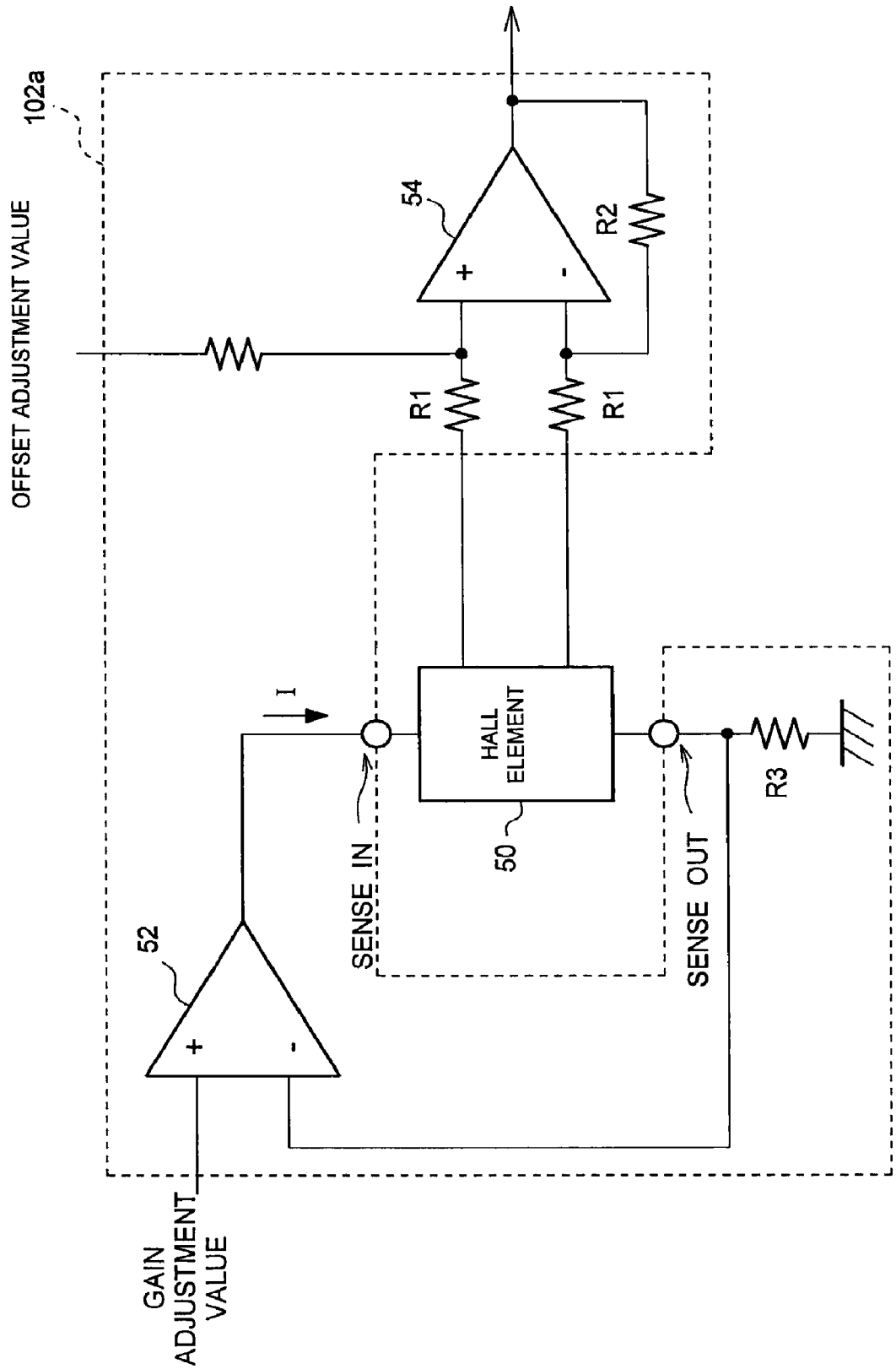
FIG. 2 is a diagram showing an example structure of a position detection element and an amplifier circuit for the position detection element according to a preferred embodiment of the present invention.

An output signal of the position detection element 102 is input to the ADC 20 after its offset and gain are adjusted by an amplifier circuit 102a. More specifically, as shown in FIG. 2, the position detection element 102 and the amplifier circuit 102a comprise a hall element 50 and operational amplifiers 52 and 54.

The hall element 50 which is a part of the position detection element 102 is connected to a feedback circuit, in the amplifier circuit 102a, which includes the operational amplifier 52 and a current limiting resistor R3, and outputs a signal having an amplitude intensity corresponding to a gain adjustment value which is input to a non-inversion terminal of the operational amplifier 52. The output signal of the hall element 50 is input to each of a non-inverting terminal and an inverting terminal of the operational amplifier 54 of the amplifier circuit 102a via a resistor R1.

The operational amplifier 54 and resistors R1 and R2 form a feedback circuit. The operational amplifier 54 adds, to the output signal of the position detection element 102 which is input to the non-inverting terminal and the inverting terminal, an offset (direct current component) corresponding to the offset adjustment value which is input to the non-inverting terminal, and outputs the resulting signal.

In addition, the output signal of the vibration detection element 106 is input to the ADC 20 after its offset and gain are adjusted by an amplifier circuit 106a. The lens driving element 104 is controlled by a control signal which is output from an amplifier 104a, and adjusts the position of the lens.

The present embodiment is described with reference to an example case in which the position detection element 102 and the vibration detection element 106 are provided so that the lens position and vibration can be detected for a yaw direction (X-axis direction) and a pitch direction (Y-axis direction) of the imaging device. In the following description, the output signals of the position detection element 102 and the vibration detection element 106 are processed, such as an addition between the X-axis components of the output signals and between the Y-axis components of the output signals, and the lens position is controlled in the yaw direction (X-axis direction) and the pitch direction (Y-axis direction) based on the processed signals. An operation to move the imaging device in a horizontal direction (yaw direction) corresponding to a movement of the object or the like is called a pan operation and an operation to move the imaging device in a vertical direction (pitch direction) is called a tilt operation.

The ADC 20 converts an analog voltage signal which is output from the position detection element 102, for example, the hall element, in to a digital signal. The hall element generates an inductive current corresponding to a magnetic force using a magnet which is fixed on the lens. In other words, the hall element outputs a voltage signal which indicates the position of the lens according to a distance to the lens, and the ADC 20 converts the voltage signal into a digital signal and outputs the converted signal as a position signal. The ADC 20 has a structure in which a signal which indicates a reference, for example, a digital value of "0", is output when the optical axis of the lens and the center of the imaging element provided in the imaging device match.

The ADC 20 also converts an analog angular velocity signal which is output from the vibration detection element 106, for example, a gyro sensor, into a digital signal. In other words, the ADC 20 digitizes the output signals from the position detection element 102 and the vibration detection element 106 in a time divisional manner and outputs the converted signals.

More specifically, the ADC 20 digitizes and outputs a signal of an X-axis component of vibration detected by the vibration detection element 106 (Gyro-X), a signal of a Y-axis component of vibration (Gyro-Y), a signal of an X-axis component of a position of the lens detected by the position detection element 102 (Hall-X), and a signal of a Y-axis component of the position (Hall-Y). The ADC 20 outputs the signals Gyro-X and Gyro-Y to the HPF 26 and the signals Hall-X and Hall-Y to the adder circuit 22 and the peak detection circuit 40.

The HPF 26 removes a direct current component included in the angular velocity signal, extracts a high-frequency component of the angular velocity signal in which the vibration of the imaging device is reflected, and outputs to the pan and tilt judgment circuit 28 and to the gain adjustment circuit 30. A tap filter or the like, which is one type of a digital filter, may be employed for the HPF 26.

The pan and tilt judgment circuit 28 detects a pan operation and a tilt operation of the imaging device based on the angular velocity signal which is output by the HPF 26. The pan and tile judgment circuit 28 judges that the imaging device is in the pan operation or in the tilt operation when a state is detected where the angular velocity signal is greater than or equal to a predetermined value for a period of a predetermined time.

The gain adjustment circuit 30 changes an amplification of the angular velocity signal which is output from the HPF 26 according to the judgment result by the pan and tilt judgment circuit 28, and a signal which is amplified by the changed amplification is output. For example, during the periods other than the pan operation period and the tilt operation period, the gain adjustment circuit 30 adjusts the gain so that the intensity of the angular velocity signal which is output from the HPF 26 is maintained. During the pan operation or the tilt operation, the gain adjustment circuit 30 adjusts the gain so that the intensity of the angular velocity signal which is output from the HPF 26 is attenuated and the output becomes zero.

The integration circuit 32 integrates the angular velocity signals (Gyro-X and Gyro-Y) which are output from the HPF 26 and generates angle signals which indicate an amount of movement of the imaging device. Preferably, the integration circuit 32 comprises a digital filter (not shown), and determines the angle signal, that is, the amount of movement of the imaging device, by applying a filter process according to a filter coefficient which is set in a register (not shown), to delay the angular velocity signal by 90°.

When the vibration correction process is applied in the imaging device, there may be cases where the position of the lens is gradually moved apart from the reference position as the vibration correction process is continuously executed, and the position of the lens may reach a point near a limit point of the movable range of the lens. In this case, the continuation of the vibration correction process may result in a situation where the lens may be moved in a certain direction, but not in the other direction. The centering processor circuit 34 is provided in order to prevent this phenomenon.

The adder circuit 22 adds the position signal (Hall-X) which is output from the ADC 20 and the vibration component signal (SV-X) having the phase adjusted by the centering processor circuit 34 and also adds the position signal (Hall-Y) which is output from the ADC 20 and the vibration component signal (SV-Y) having the phase adjusted by the centering processor circuit 34, and outputs the resulting signals to the servo circuit 24.

During the imaging, the servo circuit 24 generates a correction signal SR for controlling the driving of the lens driving element 104, according to the output signals from the adder circuit 22. The servo circuit 24 comprises a register and a digital filter, and applies a filter process using a filter coefficient which is stored in the register.

During an adjustment process of the position detection element 102, the servo circuit 24 also outputs, a reference signal for adjustment to the DAC 36. The reference signal is set as a signal having an amplitude such as to drive the lens to at least a driving limit point. In other words, when the reference signal is output from the servo circuit 24, the lens of the imaging device is driven to a maximum point in the driving range for vibration correction. The reference signal is preferably, for example, a single pulse, periodic waves such as a rectangular wave, a trapezoidal wave, a triangular wave, a sine wave (sin wave), and a cosine wave (cos wave), or the like.

The DAC 36 converts the digital correction signal SR or the digital reference signal into an analog signal. Based on the correction signal SR or the reference signal which is converted into an analog signal by the DAC 36, the lens driving element 104 drives the lens of the imaging device in the X-axis direction and in the Y-axis direction.

The peak detection circuit 40 receives the position signals (Hall-X and Hall-Y) which are output from the ADC 20, checks changes with respect to time of the position signals (Hall-X and Hall-Y), detects minimal values and maximal values of the position signals (Hall-X and Hall-Y), and outputs to the CPU 38.

The CPU 38 integrally controls the image stabilization control circuit 200. The CPU 38 sets filter coefficients, gain values, etc. of various sections (such as tap coefficient of the tap filter) of the image stabilization control circuit 200. The CPU 38 also receives a mode setting signal from a main control unit (main CPU or the like) 202 of the imaging device which is provided outside of the image stabilization control circuit 200, and sets the image stabilization control circuit 200 to the normal imaging mode or the adjustment process mode of the position detection element 102.

During the adjustment process of the position detection element 102, the CPU 38 also receives an output signal from the peak detection circuit 40, and adjusts the offset value and the gain of the output signal of the position detection element 102 based on an analysis result of the received signal. More specifically, the CPU 38 outputs an adjustment parameter of the offset value and an adjustment parameter of the amplitude to the DAC 42 based on the output signal from the peak detection circuit 40. In this manner, the gain adjustment value and the offset adjustment value for the amplifier circuit 102*a* are changed so that the position signals (Hall-X and Hall-Y) which are output from the amplifier circuit 102*a* become signals having a predetermined offset value (direct current component) and a predetermined amplitude.

The DAC 42 receives the adjustment parameter of the offset value and the adjustment parameter of the amplitude from the CPU 38 during the adjustment process of the position detection element 102, subjects these parameters to digital-to-analog conversion, and outputs the parameters as a gain adjustment value and an offset adjustment value for the amplifier circuit 102*a*.

<Vibration Correction Process During Imaging>

Movement control of the lens for correcting the vibration of the object image due to hand vibration using the image stabilization control circuit 200 will now be described. When the vibration correction process is executed during normal imaging, the CPU 38 outputs a mode setting signal which sets a normal imaging mode to the servo circuit 24, and the servo circuit 24 is set in the normal imaging mode.

First, a case will be described in which there is no vibration of the object image due to hand vibration. Because the position of the lens driven by the lens driving element 104 is such that the optical axis of the lens and the center of the imaging element provided in the imaging device match, the ADC 20 outputs digital position signals (Hall-X and Hall-Y) which indicate "0". The servo circuit 24 outputs a correction signal SR which controls the lens driving element 104 to maintain the current lens position when the values of the position signals (Hall-X and Hall-Y) are "0".

When, on the other hand, the position of the lens and the center of the imaging element do not match, the ADC 20 outputs digital position signals (Hall-X and Hall-Y) showing values different from "0". The servo circuit 24 outputs a correction signal SR which controls the lens driving element 104 so that the values of the position signals (Hall-X and Hall-Y) become "0", according to the values which are output from the ADC 20. With repetition of the above-described operation, the image stabilization control circuit 200 controls the position of the lens so that the position of the lens and the center of the imaging element match.

Next, a case will be described in which vibration of the object image is caused due to the vibration of the hand. Because the position of the lens driven by the lens driving element 104 is such that the optical axis of the lens and the center of the imaging element provided in the imaging device match, the ADC 20 outputs digital position signals (Hall-X and Hall-Y) indicating "0". On the other hand, because the imaging device is moved due to the vibration of the hand, the integration circuit 32 and the centering processor circuit 34 output vibration component signals (SV-X and SV-Y) indicating an amount of movement of the imaging device.

The servo circuit 24 generates a correction signal SR according to a signal in which the position signal (Hall-X) indicating "0" which is output from the ADC 20 and the vibration component signal (SV-X) which is output from the centering processor circuit 34 are added. In this case, although the position signal (Hall-X) is "0", because the vibration component signal (SV-X) which is not "0" is added, the servo circuit 24 generates a correction signal SR which moves the lens. The lens driving element 104 for the X-axis is controlled according to the correction signal SR. Similarly, the servo circuit 24 generates a correction signal SR according to a signal in which the position signal (Hall-Y) indicating "0" which is output from the ADC 20 and the vibration component signal (SV-Y) which is output from the centering processor circuit 34 are added. In this case, although the position signal (Hall-Y) is "0", because the vibration component signal (SV-Y) which is not "0" is added, the servo circuit 24 generates the correction signal SR which moves the lens. The lens driving element 104 for the Y-axis is controlled according to the correction signal SR. Because the lens driving element 104 moves the lens based on the correction signal SR which is output from the servo circuit 24, the imaging element provided in the imaging device can obtain a signal in which the vibration of the object image due to the vibration of the hand is inhibited. By repeating such a control, the image stabilization control circuit 200 realizes the vibration correction control.

In the present embodiment, a structure is employed in which, when the angle signal indicating the amount of movement of the imaging device is generated based on the angular velocity signal obtained from the vibration detection element 106, the angle signal is generated using the HPF 26, the integration circuit 32, and the centering processor circuit 34. Because of this structure, it is not necessary to use the CPU 38 for generation of the angle signal, resulting in a reduction of the power consumption in the image stabilization control circuit 200.

In addition, in the present embodiment, a structure in employed in which the image stabilization control circuit 200 comprises the HPF 26, the integration circuit 32, and the centering processor circuit 34. With this structure, it is possible to reduce the circuit area compared to a structure in which the above-described processes are executed by the CPU 38. In this manner, it is possible to reduce the cost of the semiconductor chip on which the image stabilization control circuit 200 is equipped.

<Output Adjustment Process of Position Detection Element>

Next, an adjustment process of the output of the position detection element 102 using the image stabilization control circuit 200 will be described. When the output of the position detection element 102 is adjusted, the CPU 38 outputs a mode setting signal which sets an adjustment process mode to the servo circuit 24, receives an output of the peak detection circuit, and adjusts the output of the position detection element 102.

When the adjustment process mode is set, the servo circuit 24 outputs a reference signal to the DAC 36. As described above, the reference signal is a signal having an amplitude such as to drive the lens at least to the drive limit point. With the input of the reference signal, the lens driving element 104 displaces the lens of the imaging device to the limit of the driving range.

Figure 3:
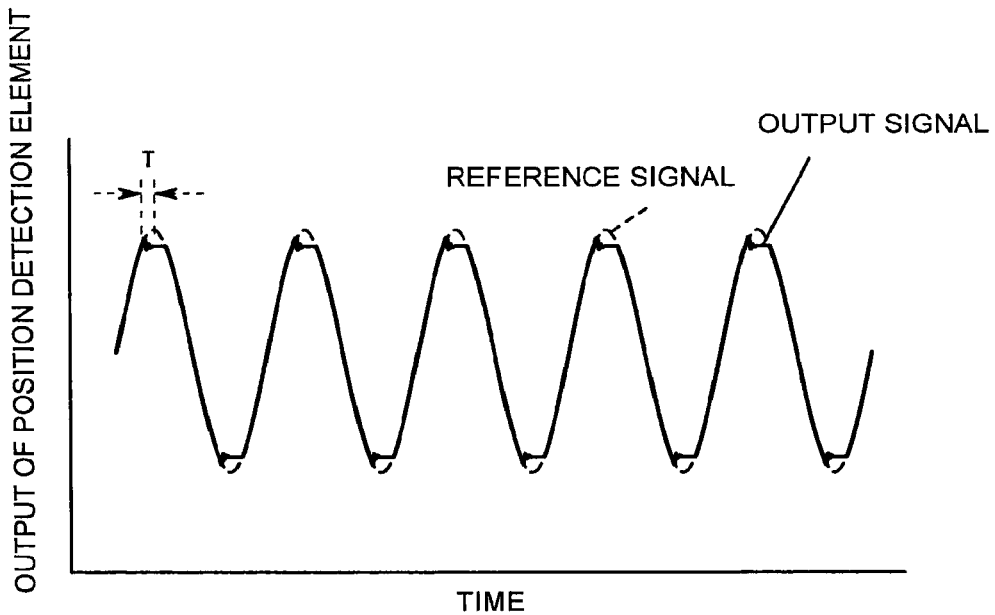
FIG. 3 is a diagram showing an example output signal of a position detection element in a preferred embodiment of the present invention.

In response to such driving of the lens, the position detection element 102 outputs an output signal having a waveform corresponding to the reference signal, as shown in FIG. 3. FIG. 3 shows a case where the reference signal is a sin wave. Because the reference signal has an amplitude to drive the lens to the driving limit point, the signal which is output from the position detection element 102 would have a waveform in which the waveform of the reference signal is chopped at a predetermined amplitude.

The amplifier circuit 102a amplifies and converts the output signal of the position detection element 102 so that the offset value and the amplitude are those determined by the gain adjustment value and the offset adjustment value from the DAC 42, and outputs the resulting signal to the ADC 20. The output signal which is digitized in the ADC 20 is input to the peak detection circuit 40.

The peak detection circuit 40 detects a peak of the input signal and outputs the peak to the CPU 38. In this process, as shown in FIG. 3, ringing which occurs when the driving limit of the lens is reached is often superposed on the output signal of the position detection signal 102. Therefore, it is preferable that, in the peak detection circuit 40, the peak is detected after a time T has elapsed, at which point the ringing of the input signal will be reduced. The time T can be set in advance corresponding to the waveform, amplitude, period, etc. of the reference signal. Alternatively, the peak detection may be executed a plurality of times during one period of the output signal of the position detection element 102 and an average may be determined. More specifically, the peak detection is repeatedly executed a plurality of times for each of the maximal value and the minimal value after the time T has elapsed, and an average is calculated so that the peak value can be determined accurately and in a short time.

Figure 4:
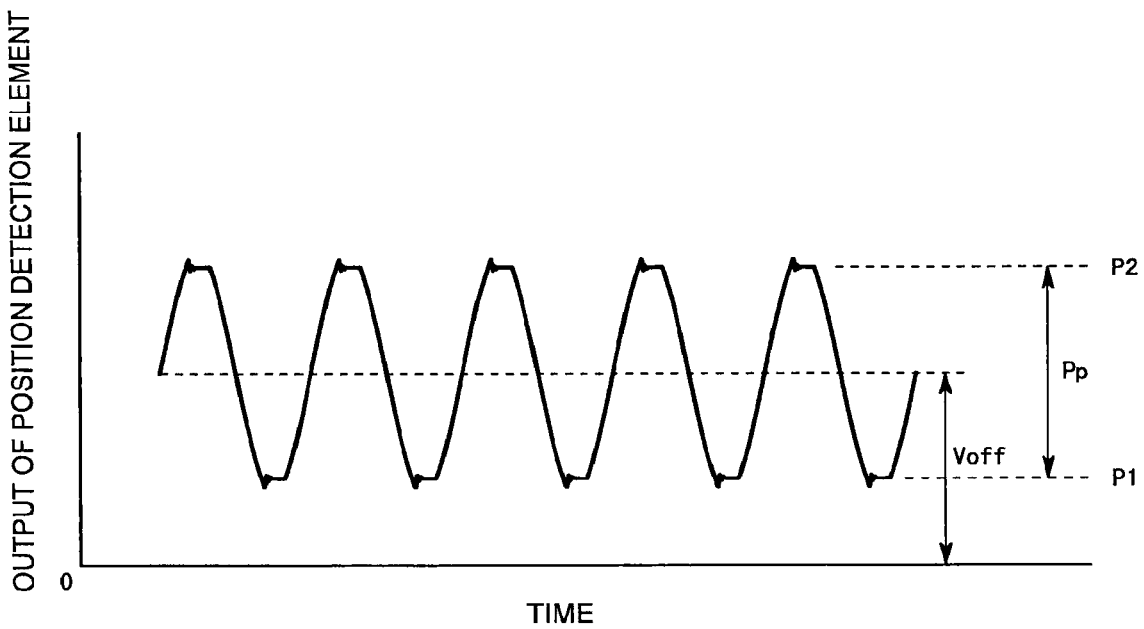
FIG. 4 is a diagram for explaining an output adjustment process of a position detection element in a preferred embodiment of the present invention.
Figure 5:
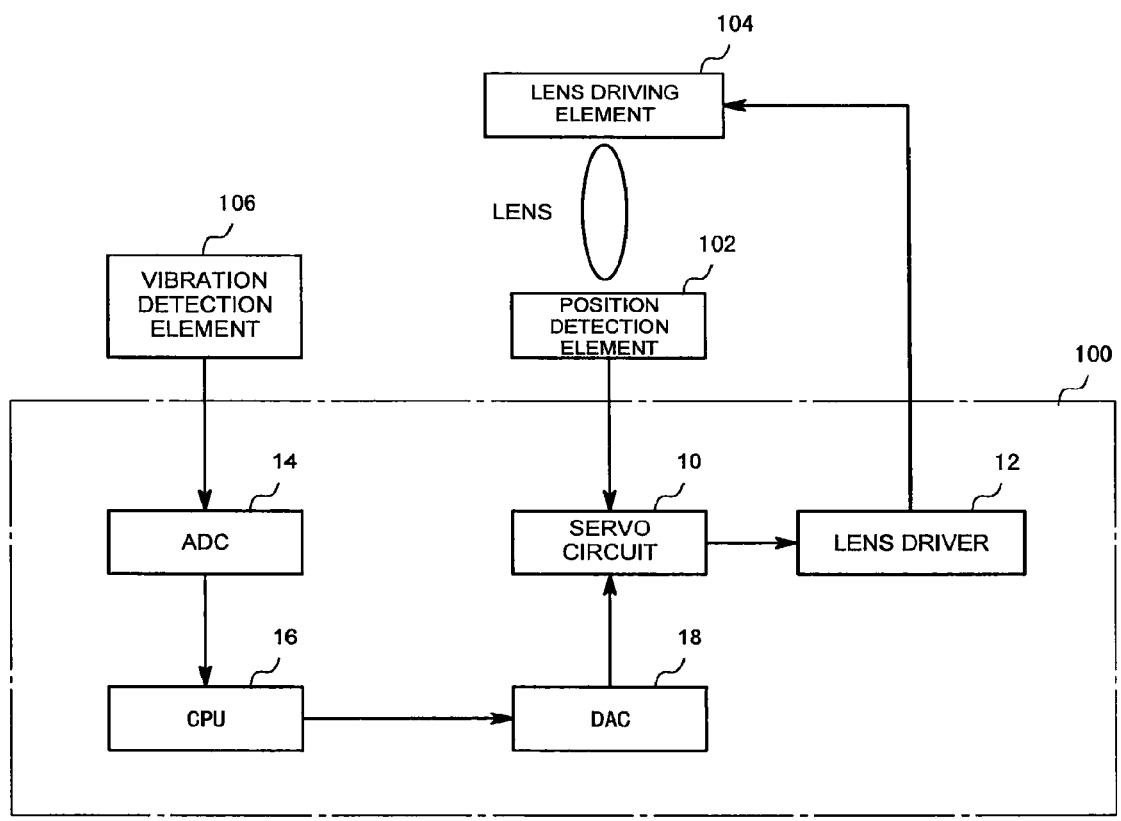
FIG. 5 is a diagram showing a structure of a image stabilization control circuit in the related art.

The CPU 38 determines the offset value and the amplitude of the output signal from the amplifier circuit 102a based on the peak detected by the peak detection circuit 40. More specifically, as shown in FIG. 4, the CPU 38 calculates, based on the minimal value P1 and the maximal value P2 of the output signal of the position detection element 102 detected by the peak detection circuit 40, an offset value Voff=(maximal value P2−minimal value P1)/2+minimal value P1 and an amplitude Pp=(maximal value P2−minimal value P1). Although FIG. 4 is drawn with an analog signal in order to facilitate the explanation, the actual signal is a digital signal.

The CPU 38 determines a difference ΔVoff between the calculated offset value Voff and a predetermined reference offset value, and a difference ΔPp between the calculated amplitude Pp and a reference amplitude. The CPU 38 then outputs an adjustment parameter PRoff of the offset value to the DAC 42 so that the difference ΔVoff is reduced, and outputs an adjustment parameter PRp of the amplitude to the DAC 42 so that the difference ΔPp is reduced.

Alternatively, the CPU 38 may output the differences ΔVoff and ΔPp to the external main control unit (main CPU or the like) 202, as necessary.

The adjustment parameter PRoff of the offset value and the adjustment parameter PRp of the amplitude are converted by the DAC 42 into analog signals, and are input to the amplifier circuit 102a as the offset adjustment value and the gain adjustment value. With this process, the offset and the gain in the amplifying process in the amplifier circuit 102a are again set.

By repeating the above-described process, it is possible to set the offset value and the amplitude of the output signal which is output from the position detection element 102 and the amplifier circuit 102a to desired values in a state where the lens is driven to the driving limit point in response to the reference signal, that is, a state where the lens is displaced to the maximum.

As described, in the image stabilization control circuit 200, suitable offset and amplitude can be set for the output signal of the position detection element 102. For example, the imaging device may be adjusted prior to the shipping of the imaging device so that influences of variation among elements of the equipped position detection elements 102 are removed.

Moreover, although in the present embodiment, a configuration is employed in which the hall element, the voice coil motor, and the gyro sensor are employed as the position detection element 102, the lens driving element 104, and the vibration detection element 106, the present invention is not limited to such a configuration. For example, a piezo element may be used for the lens driving element 104. In addition, for the vibration detection element 106, a sensor which detects acceleration in a linear direction may be used and the vibration of the imaging device may be detected based on the acceleration signal.

Although in the present embodiment, a lens shift method is employed in which the vibration correction process is executed by driving the lens, the present invention is not limited to such a configuration. For example, the present invention can be applied to a CCD shift method in which the imaging element such as the CCD element is shifted according to the vibration of the imaging device. In this case, the position detection element 102 may be set as an element which detects the position of the imaging element and the lens driving element 104 may be set as an element which drives the imaging element.

What is claimed is:

1. An image stabilization control circuit that drives an optical component or an imaging element of an imaging device according to vibration and that reduces influence of the vibration on imaging, the image stabilization control circuit comprising:
   a position detecting element configured to detect a position of the optical component or the imaging element; the position detecting element comprising a Hall element and being configured to output an output signal having an offset;
   an amplifier circuit configured to adjust the offset of the output signal of the position detection element corresponding to an offset adjustment value, and amplify with a gain corresponding to a gain adjustment value;
   at least one analog-to-digital converter circuit that converts an output signal of a vibration detection element which detects vibration of the imaging device and the output signal of the position detection element which is processed by the amplifier circuit into digital signals; and
   a logic circuit that generates a control signal which drives the optical component or the imaging element, based on the output signal of the vibration detection element which is digitized by the analog-to-digital converter circuit and the output signal of the position detection element which is digitized by the analog-to-digital converter circuit, the control signal including the offset adjustment value and the gain adjustment value;
   wherein the gain adjustment value is determined and output by the central processing unit;
   the offset adjustment value is determined and output by the central processing unit; and
   the amplifier circuit comprises:
      a first operational amplifier having a first non-inverting input, a first inverting input, and a first output; and
      a second operational amplifier having a second non-inverting input, a second inverting input, and a second output;
      wherein the gain adjustment value determined and output by the central processing unit is input into the first non-inverting input;
      the offset adjustment value determined and output by the central processing unit value is input to the second non-inverting input;
      the first operational amplifier is configured to set an output voltage of the Hall element as an amplification intensity corresponding to a difference with the gain adjustment value and
      the second operational amplifier is configured to add an offset corresponding to the offset adjustment value to the output of the Hall element and outputs the resulting value and adjusts an offset value and an amplitude for the output signal of the position detection element; and
   a peak value of the output signal of the position detecting element is detected after a lapse of a period of a predetermined time during which ringing occurring when a driving limit of a lens is reached in a peak detection circuit is reduced, and an offset value and an amplitude are adjusted based on the peak value.

2. The image stabilization control circuit according to claim 1, wherein
   the offset value and the amplitude, of the output signal from the position detection element which is digitized by the analog-to-digital converter circuit, are determined in a state where a reference signal which drives the optical component or the imaging element to a maximum is supplied to a driving unit of the optical component and the optical component or the imaging element is driven,
   the offset value is adjusted for the output signal of the position detection element according to a difference between the offset value and a predetermined reference offset value, and
   the amplitude is adjusted for the output signal of the position detection element according to a difference between the amplitude and a predetermined reference amplitude.

3. The image stabilization control circuit according to claim 1, wherein
   the logic circuit comprises a peak detection circuit which detects a minimal value and a maximal value of the output signal from the position detection element which is digitally converted by the analog-to-digital converter circuit, and the offset value of the output signal of the position detection element is determined based on a difference between the maximal value and the minimal value.

4. The image stabilization control circuit according to claim 2, wherein the logic circuit comprises a peak detection circuit that detects a minimal value and a maximal value of the output signal from the position detection element which is digitally converted by the analog-to-digital converter circuit, and the amplitude of the output signal of the position detection circuit is determined based on a difference between the maximal value and the minimal value.

5. The image stabilization control circuit according to claim 1, wherein the position detection element is a hall element, and the image stabilization control circuit further comprises a current control circuit which controls a driving current of the hall element, and the offset value is adjusted for the output signal of the position detection element by controlling the driving current of the hall element with the current control circuit.

6. An imaging device comprising the image stabilization control circuit according to claim 1, comprising:
the vibration detection element;
the position detection element; and
a driving element that is connected to the image stabilization control circuit and that drives the optical component or the imaging element according to the control signal.

* * * * *